(12) United States Patent
Zhao

(10) Patent No.: US 11,835,079 B1
(45) Date of Patent: Dec. 5, 2023

(54) ANTI-VIBRATION NUT/BOLT SYSTEM

(71) Applicant: Shurun Zhao, Tampa, FL (US)

(72) Inventor: Shurun Zhao, Tampa, FL (US)

( * ) Notice: Subject to any disclaimer, the term of this patent is extended or adjusted under 35 U.S.C. 154(b) by 256 days.

(21) Appl. No.: 16/790,229

(22) Filed: Feb. 13, 2020

(51) Int. Cl.
  *F16B 35/04* (2006.01)
  *F16B 39/282* (2006.01)
  *F16B 37/00* (2006.01)

(52) U.S. Cl.
  CPC .......... *F16B 39/282* (2013.01); *F16B 35/041* (2013.01); *F16B 37/00* (2013.01)

(58) Field of Classification Search
  CPC ....... F16B 39/282; F16B 35/041; F16B 39/30
  USPC .......................................... 411/308, 332, 957
  See application file for complete search history.

(56) References Cited

U.S. PATENT DOCUMENTS

| | | | | |
|---|---|---|---|---|
| 3,433,117 | A * | 3/1969 | Gowen, Jr. ............. | F16B 33/02 411/411 |
| 3,752,203 | A * | 8/1973 | Hill, Jr. ................. | F16B 39/282 411/959 |
| 4,094,352 | A * | 6/1978 | Hlinsky ................ | F16B 39/282 411/959 |
| 4,290,469 | A * | 9/1981 | Nakae .................... | F16B 39/282 411/188 |
| RE31,284 | E * | 6/1983 | Holmes ................... | F16B 39/30 411/311 |
| 4,540,321 | A * | 9/1985 | Berecz .................... | F16B 39/30 411/310 |
| 4,842,463 | A * | 6/1989 | Landt .................... | F16B 39/282 411/959 |
| 5,624,219 | A * | 4/1997 | Hamanaka ............ | F16B 31/021 411/917 |
| 5,738,472 | A * | 4/1998 | Roopnarine ............ | F16B 39/30 411/366.3 |
| 5,876,168 | A * | 3/1999 | Iwata ...................... | F16B 39/30 411/308 |
| 2006/0216129 | A1 * | 9/2006 | Lin ........................ | F16B 39/282 411/161 |
| 2008/0089759 | A1 * | 4/2008 | Diekmeyer .......... | B01D 53/261 411/311 |
| 2015/0050102 | A1 * | 2/2015 | Lu ........................... | F16B 39/28 470/70 |

* cited by examiner

*Primary Examiner* — Gary W Estremsky
(74) *Attorney, Agent, or Firm* — Sandra L. Layer

(57) ABSTRACT

A bolt has an axis and a bolt plane perpendicular to the axis. The bolt has male bolt threads. Each male bolt thread has a bolt root and a bolt crest. Each male bolt thread forms axially interior and exterior male surfaces extending radially exteriorly away from the axis and forms a first angle with respect to the bolt plane. A nut has an axis and a nut plane perpendicular to the axis. The nut has female nut threads. Each female nut thread has a nut root and a nut crest. Each female nut thread forms axially interior and exterior female surfaces extending radially interiorly toward the axis and forms a second angle with respect to the nut plane. The first angle and the second angle are not equal.

12 Claims, 4 Drawing Sheets

ANTI-VIBRATION NUT/BOLT SYSTEM

BACKGROUND OF THE INVENTION

FIELD OF THE INVENTION

The present invention relates to an anti-vibration nut/bolt system and more particularly pertains to abating unintended relative rotational movement between a coupled nut and bolt and for securing together parts joined by the nut and bolt. The abating and the securing are done in a safe, convenient, and economical manner.

DESCRIPTION OF THE PRIOR ART

The use of nut and bolt systems of known designs and configurations is known in the prior art. More specifically, nut and bolt systems of known designs and configurations previously devised and utilized for the purpose of abating rotational movement between coupled nuts and bolts are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an anti-vibration nut/bolt system that allows abating unintended relative rotational movement between a coupled nut and bolt and for securing together parts joined by the nut and bolt. The abating and the securing are done in a safe, convenient, and economical manner.

In this respect, the anti-vibration nut/bolt system according to the present invention substantially departs from the conventional concepts and designs of the prior art, and in doing so provides an apparatus primarily developed for the purpose of abating unintended relative rotational movement between a coupled nut and bolt and for securing together parts joined by the nut and bolt. The abating and the securing are done in a safe, convenient, and economical manner.

Therefore, it can be appreciated that there exists a continuing need for a new and improved anti-vibration nut/bolt system which can be used for abating unintended relative rotational movement between a coupled nut and bolt and for securing together parts joined by the nut and bolt. The abating and the securing are done in a safe, convenient, and economical manner. In this regard, the present invention substantially fulfills this need.

SUMMARY OF THE INVENTION

In view of the disadvantages inherent in the known types of nut and bolt systems of known designs and configurations now present in the prior art, the present invention provides an improved anti-vibration nut/bolt system. As such, the general purpose of the present invention, which will be described subsequently in greater detail, is to provide a new and improved anti-vibration nut/bolt system and method which has all the advantages of the prior art and none of the disadvantages.

To attain this, for a broad perspective, the present invention essentially comprises an anti-vibration nut/bolt system. First provided is a bolt having an axis and a bolt plane perpendicular to the axis. The bolt has male bolt threads. Each male bolt thread has a bolt root and a bolt crest. Each male bolt thread forms axially interior and exterior male surfaces extending radially exteriorly away from the axis and forms a first angle with respect to the bolt plane. Next provided is the nut having an axis and a nut plane perpendicular to the axis. The nut has female nut threads. Each female nut thread has a nut root and a nut crest. Each female nut thread forms axially interior and exterior female surfaces extending radially interiorly toward the axis and forms a second angle with respect to the nut plane. The first angle is greater than the second angle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved anti-vibration nut/bolt system which has all of the advantages of the prior art nut and bolt systems of known designs and configurations and none of the disadvantages.

It is another object of the present invention to provide a new and improved anti-vibration nut/bolt system which may be easily and efficiently manufactured and marketed.

It is a further object of the present invention to provide a new and improved anti-vibration nut/bolt system which is of durable and reliable constructions.

An even further object of the present invention is to provide a new and improved anti-vibration nut/bolt system which is susceptible of a low cost of manufacture with regard to both materials and labor, and which accordingly is then susceptible of low prices of sale to the consuming public, thereby making such anti-vibration nut/bolt system economically available to the buying public.

Lastly, it is an object of the present invention to provide an anti-vibration nut/bolt system for abating unintended relative rotational movement between a coupled nut and bolt and for securing together parts joined by the nut and bolt. The abating and the securing are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
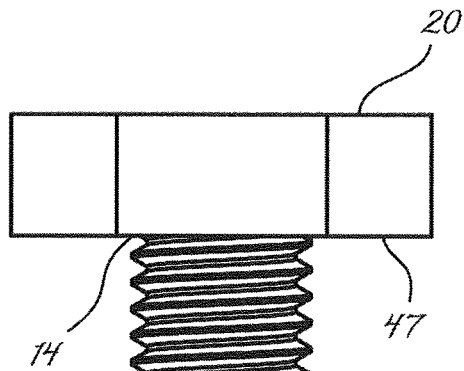
FIG. 1 is an elevational view, partly in cross-section, illustrating an anti-vibration nut/bolt system constructed in accordance with the principles of the preset invention.
Figure 2:
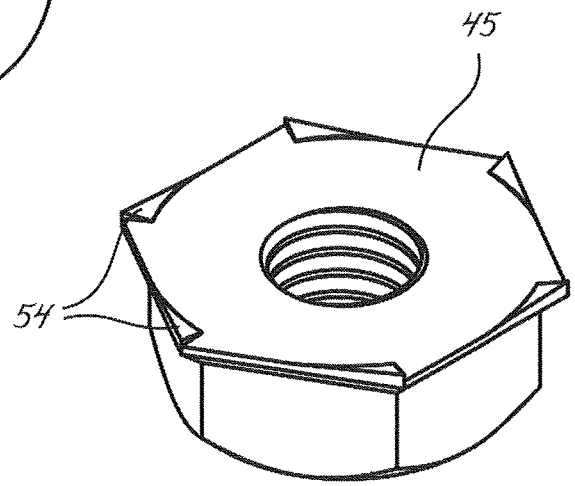
FIG. 2 is a perspective illustration of the nut of FIG. 1.
Figure 3:
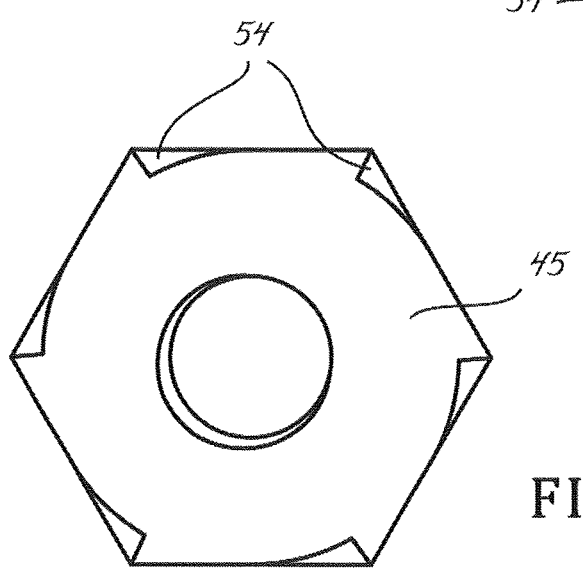
FIG. 3 is a perspective illustration of the nut shown in FIGS. 1 and 2.

With reference now to the drawings, and in particular to FIG. 1 thereof, the preferred embodiment of the new and improved anti-vibration nut/bolt system embodying the principles and concepts of the present invention and generally designated by the reference numeral 10 will be described.

The present invention, the anti-vibration nut/bolt system 10 is comprised of a plurality of components. Such components in their broadest context include a bolt and a nut. Such components are individually configured and correlated with respect to each other so as to attain the desired objective.

From a specific perspective, the invention of the present application is an anti-vibration nut/bolt system 10 for abating unintended relative rotational movement between a coupled nut 12 and bolt 14 and for securing together parts joined by the nut and bolt. The abating and the securing are done in a safe, convenient, and economical manner. First provided is the bolt 14. The bolt has a threaded end 18 and a head end 20. The bolt has an axis 22. The bolt has a bolt plane 24 perpendicular to the axis. The threaded end has male bolt threads. Each male bolt thread has a bolt root 26 radially interiorly and a bolt crest 28 radially exteriorly. Each male bolt thread forms an axially interior male bolt surface 30 and an axially exterior male bolt surface 32. The axially interior male bolt surface extends radially away from the axis and forms an angle of positive 30 degrees (British Unit 27.5 degrees) with respect to the bolt plane. The axially exterior male bolt surface extends radially exteriorly from the axis and forms an angle of negative 30 degrees (British Unit 27.5 degrees) with respect to the bolt plane.

Figure 7:
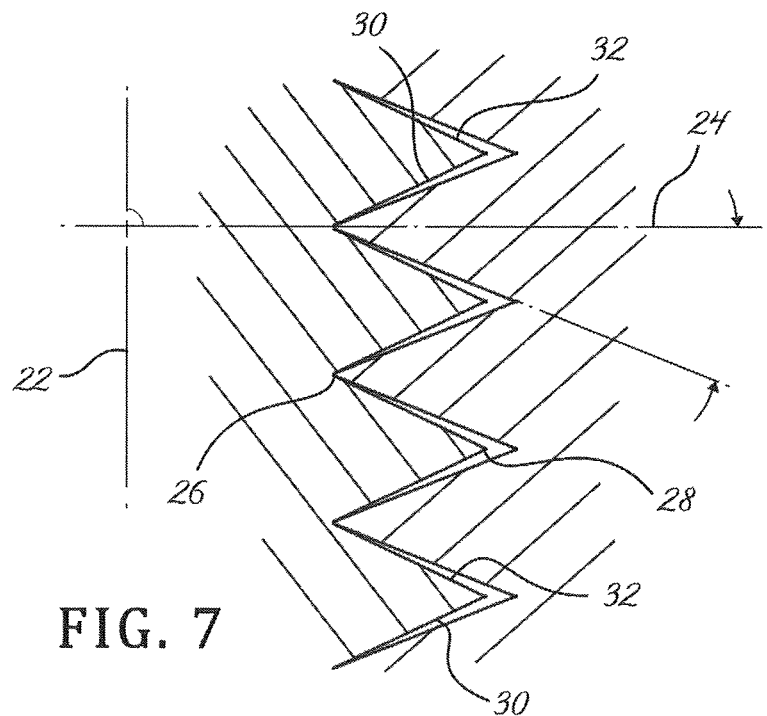
FIG. 7 is an enlarged showing taken at circle 7 of FIG. 1 showing an axis and a plane taken centrally through a root of a bolt.
Figure 8:
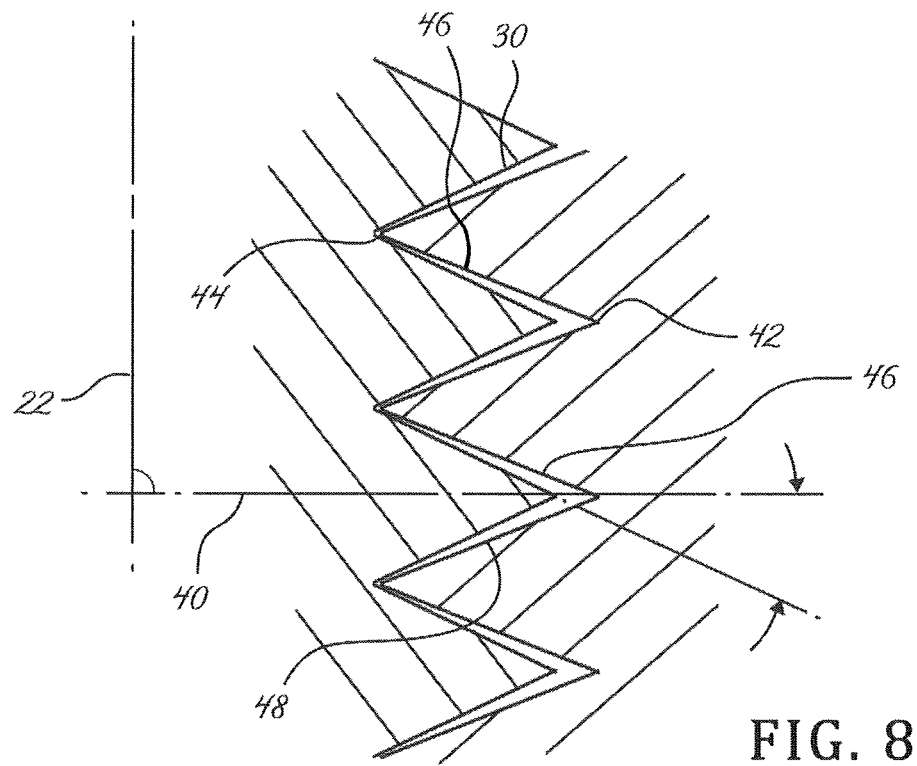
FIG. 8 is an enlarged showing taken at circle 7 of FIG. 1 showing an axis and a plane taken centrally through a root of a nut.
Figure 9:
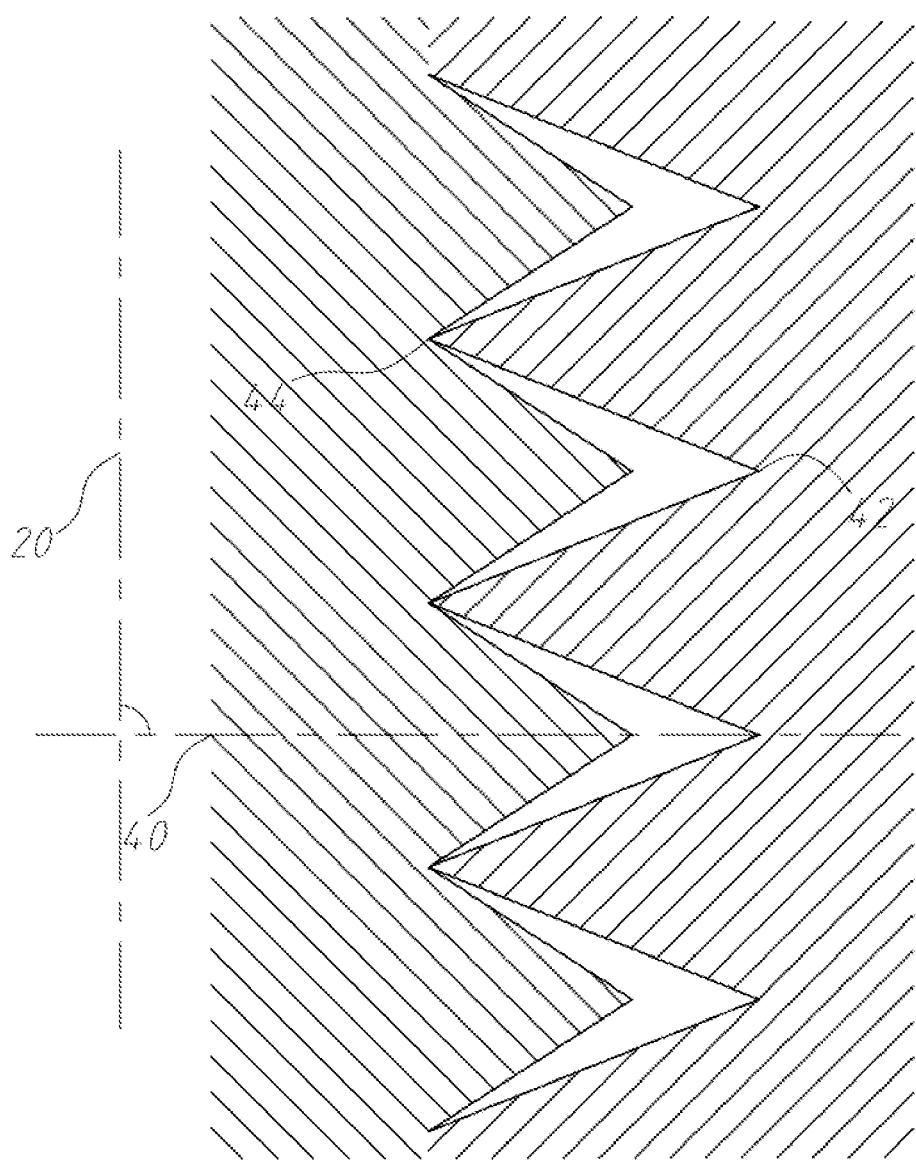
FIG. 9 is an enlarged showing taken at circle 7 of FIG. 1 showing an axis and a plane taken centrally through a root of a nut wherein the axially interior female nut surface extends radially interiorly toward the axis and forms a smaller angle with respect to the nut plane and a higher crest height than shown in FIG. 8.

Next, the nut 12 is provided. The nut has a free end 36 and a pressure end 38. The nut has an axis. The nut has a nut plane 40 perpendicular to the axis. The axis of the nut is coextensive with the axis of the bolt. The nut has female nut threads. Each female nut thread has a nut root 42 radially exteriorly and a nut crest 44 radially interiorly. Each female nut thread forms an axially interior female nut surface 46 and an axially exterior female nut surface 48. The axially interior female nut surface extends radially interiorly toward the axis and forms an angle of positive 20 to 27 degrees with respect to the nut plane. The axially exterior female nut surface extends radially interiorly from the axis and forms an angle of negative 20 to 27 degrees plus or minus five percent with respect to the nut plane. FIGS. 7 and 8 shows an enlarged view of the threads including the relationship between the angles with respect to the bolt/nut and depicts the smaller angle of the nut compared to the angle of the bolt. FIG. 9 shows an axis and a plane taken centrally through a root of a nut wherein the axially interior female nut surface extends radially interiorly toward the axis and forms an angle of positive 20 degrees with respect to the nut plane and the axially exterior female nut surface extends radially interiorly from the axis and forms an angle of negative 20 degrees with respect to the nut plane. The positive and negative angle of the nut thread with respect to the nut plane is smaller than the angle shown in FIGS. 7 and 8 resulting in the nut thread having a higher crest 44 height.

Lastly, a pressure assembly is provided. The pressure assembly includes a six-sided annular surface 45 on the nut. The annular surface on the nut faces in a first direction. The pressure assembly includes a six-sided annular surface 47 on the bolt. The annular surface on the bolt faces in a second direction opposite from the first direction. A plurality of curved resilient tabs 54 on the annular surface on the bolt whereby rotation between the nut and the bolt in a first direction will move together the annular surfaces on the nut and the bolt whereby rotation between the nut and the bolt in a second direction will cause moving apart of the annular surfaces on the nut and the bolt. The moving apart as caused by vibrations is retarded by frictional contact between the interior surface of the nut and the exterior surface of the bolt.

Figure 4:
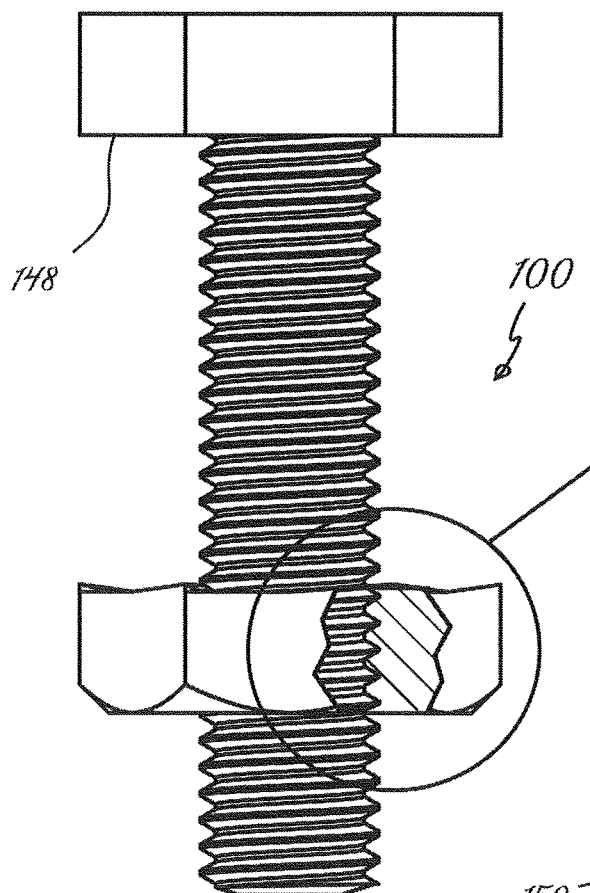
FIG. 4 is an elevational view, partly in section, illustrating an alternate embodiment of the invention.
Figure 5:
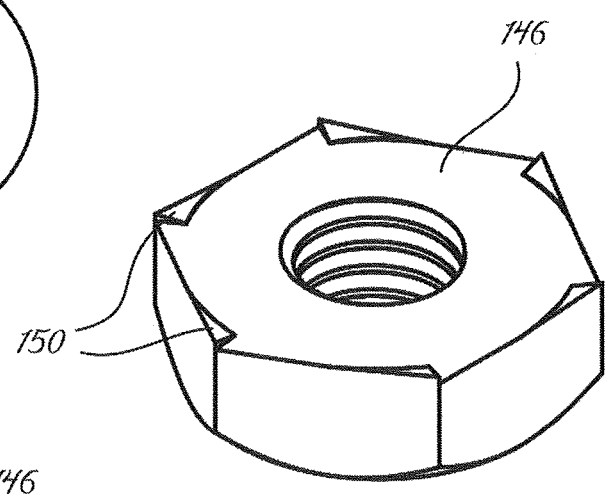
FIG. 5 is a perspective illustration of the nut of FIG. 4.
Figure 6:
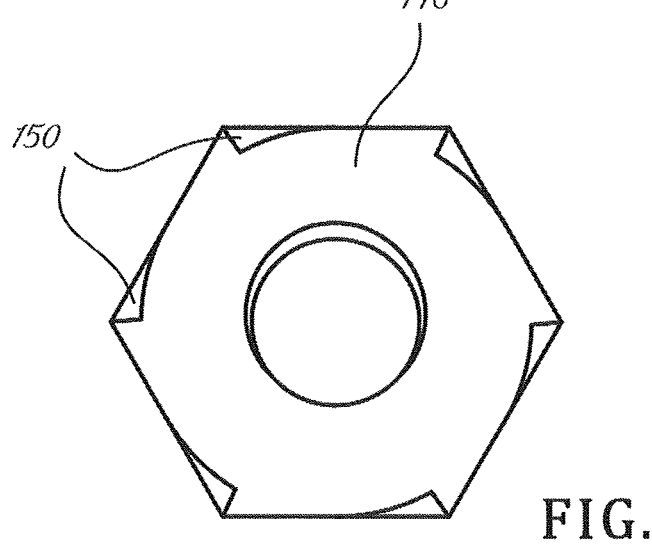
FIG. 6 is a perspective illustration of the nut shown in FIGS. 4 and 5.

An alternate embodiment of the invention is shown in FIGS. 4, 5 and 6. In this embodiment, the pressure assembly of the system 100 includes a six-sided annular surface 146 on the nut. The annular surface on the nut faces in a first direction. The pressure assembly also includes a six sided annular surface 148 on the bolt. The annular surface on the bolt facing in a second direction opposite from the first direction. The annular surface of the nut and the annular surface of the bolt are of the same size. A plurality of curved resilient tabs 150 on the annular surface on the nut are provided whereby rotation between the nut and the bolt in a first direction will move together the annular surfaces on the nut and the bolt and whereby rotation between the nut and the bolt in a second direction will move apart the annular surfaces on the nut and the bolt. The moving apart as caused by vibrations are thereby retarded by frictional contact between the interior surface of the nut and the exterior surface of the bolt.

Although the invention discloses a nut with a 40 to 54 degree root for use with a coarse bolt with a 60 degree (British Unit 55 degrees) root, the invention can also be a bolt with a 40 to 54 degree root for a nut with a 60 degree (British Unit 55 degrees) root.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An anti-vibration nut/bolt system comprising:

a standard bolt having an axis and a bolt plane perpendicular to the axis, the bolt having male bolt threads, each male bolt thread having a bolt root and a bolt crest, each male bolt having a bolt root diameter consistent along the length of the bolt, each male bolt having a crest diameter consistent along the length of the bolt, each male bolt thread forming an axially interior male bolt surface (30) and an axially exterior male bolt surface (32), the axially interior male bolt surface extending radially exteriorly away from the axis and forming an angle of positive 30 degrees of the standard bolt with respect to the bolt plane, the axially exterior male bolt surface extending radially exteriorly from the axis and forming an angle of negative 30 degrees of the standard bolt and negative with respect to the bolt plane, the bolt threads formed as a triangle, the bolt threads having a thread pitch, the thread pitch equal to the base of the triangle, the thread pitch of the bolt forming a first base length, the bolt threads having a crest, the distance between the bolt root and the bolt crest forming a first crest height;

the nut having an axis and a nut plane perpendicular to the axis, the nut having female nut threads, each female nut thread having a nut root and a nut crest, the nut root diameter consistent along the length of the nut, the nut crest diameter consistent along the length of the nut, each female nut thread forming an axially interior female nut surface (46) and an axially exterior female nut surface (48), the axially interior female nut surface extending radially interiorly toward the axis and forming an angle of positive 20 to 26 degrees with respect to the nut plane, the axially exterior female nut surface extending radially interiorly from the axis and forming an angle of negative 20 to 26 degrees with respect to the nut plane, the nut threads formed as a triangle, the nut threads having a thread pitch, the thread pitch equal to the base of the triangle, the thread pitch of the nut thread forming a second base length, the distance between the nut root and the nut crest forming a second crest height, the second crest height relative to the angle of the axially exterior female nut surface;

the first base length being equal to the second base length, the second crest height being greater than the first crest height.

2. The system as set forth in claim 1 and further including a pressure assembly including a six sided annular surface (47) on the bolt, the annular surface on the bolt facing in a first direction, the pressure assembly also including a six sided annular surface (45) on the nut, the annular surface on the nut facing in a second direction opposite from the first direction, the annular surface of the nut being larger than the annular surface of the bolt, a plurality of curved resilient tabs (54) on the annular surface on the nut whereby rotation between the nut and the bolt in a first direction will move together the annular surfaces on the nut and the bolt and whereby rotation between the nut and the bolt in a second direction will move apart the annular surfaces on the nut and the bolt with the moving apart retarded by frictional contact between the interior surface of the nut and the exterior surface of the bolt.

3. The system (100) as set forth in claim 1 and further including a pressure assembly including a six sided annular surface (146) on the nut, the annular surface on the nut facing in a first direction, the pressure assembly also including a six sided annular surface (148) on the bolt, the annular surface on the bolt facing in a second direction opposite from the first direction, the annular surface of the nut and the annular surface of the bolt being of the same size whereby rotation between the nut and the bolt in a first direction will move together the annular surfaces on the nut and the bolt and whereby rotation between the nut and the bolt in a second direction will move apart the annular surfaces on the nut and the bolt with the moving apart as caused by vibrations being retarded by frictional contact between the interior surface of the nut and the exterior surface of the bolt.

4. The system as set forth in claim 1 and further including a pressure assembly including a six sided annular surface on the bolt, the annular surface on the bolt facing in a first direction, the pressure assembly also including a six sided annular surface on the nut, the annular surface on the nut facing in a second direction opposite from the first direction, whereby rotation between the nut and the bolt in a first direction will move together the annular surfaces on the nut and the bolt and whereby rotation between the nut and the bolt in a second direction will move apart the annular surfaces on the nut and the bolt with the moving apart retarded by frictional contact between the interior surface of the nut and the exterior surface of the bolt.

5. An anti-vibration nut/bolt system (10) for abating unintended relative rotational movement between a coupled nut (12) and bolt (14) and for securing together parts joined by the nut and bolt, the system comprising, in combination:

the bolt (14) having a threaded end (18) and a head end (20), the bolt having an axis (22) and a bolt plane (24) perpendicular to the axis, the threaded end having male bolt threads, each male bolt thread having a bolt root (26) radially interiorly and a bolt crest (28) radially exteriorly, the bolt root diameter consistent along the length of the bolt, the bolt crest diameter consistent along the length of the bolt, each male bolt thread forming an axially interior male bolt surface (30) and an axially exterior male bolt surface (32), the axially interior male bolt surface extending radially exteriorly away from the axis and forming an angle of positive 30 degrees for a standard bolt, with respect to the bolt plane, the axially exterior male bolt surface extending radially exteriorly from the axis and forming an angle of negative 30 degrees for a standard bolt with respect to the bolt plane;

the nut root diameter consistent along the length of the nut, the nut crest diameter consistent along the length of the nut, a pressure assembly including a six sided annular surface (45) on the nut, the annular surface on the nut facing in a first direction, the pressure assembly including a six sided annular surface (47) on the bolt, the annular surface on the bolt facing in a second direction opposite from the first direction, a plurality of curved resilient tabs (54) on the annular surface on the nut whereby rotation between the nut and the bolt in a first direction will move together the annular surfaces on the nut and the bolt and whereby rotation between the nut and the bolt in a second direction will cause moving apart the annular surfaces on the nut and the bolt, the moving apart as caused by vibrations being retarded by frictional contact between the interior surface of the nut and the exterior surface of the bolt.

6. An anti-vibration nut/bolt system comprising:

a standard bolt having an axis and a bolt plane perpendicular to the axis, the bolt having male bolt threads, each male bolt thread having a bolt root and a bolt crest, each male bolt having a bolt root diameter consistent along the length of the bolt, each male bolt having a crest diameter consistent along the length of the bolt, each male bolt thread foiling an axially interior male bolt surface (30) and an axially exterior male bolt surface (32), the axially interior male bolt surface extending radially exteriorly away from the axis and forming an angle of positive 20 to 26 degrees with respect to the bolt plane, the axially exterior male bolt surface extending radially exteriorly from the axis and forming an angle of negative 20 to 26 degrees with respect to the bolt plane;

the nut having an axis and a nut plane perpendicular to the axis, the nut having female nut threads, each female nut thread having a nut root and a nut crest, the nut root diameter consistent along the length of the nut, the nut crest diameter consistent along the length of the nut, each female nut thread forming an axially interior female nut surface (46) and an axially exterior female nut surface (48), the axially interior female nut surface extending radially interiorly toward the axis and forming an angle of positive 30 degrees for the standard bolt with respect to the nut plane, the axially exterior female nut surface extending radially interiorly from the axis and forming an angle of negative 30 degrees for the standard bolt with respect to the nut plane, the bolt threads formed as a triangle, the bolt threads having a thread pitch, the thread pitch equal to the base of the triangle, the thread pitch of the bolt thread forming a second base length, the distance between the bolt root and the bolt crest forming a second crest height, the second crest height relative to the angle of the axially exterior female bolt surface;

the first base length being equal to the second base length, the second crest height being greater than the first crest height.

7. The system as set forth in claim 6 and further including a pressure assembly including a six sided annular surface (47) on the bolt, the annular surface on the bolt facing in a first direction, the pressure assembly also including a six sided annular surface (45) on the nut, the annular surface on the nut facing in a second direction opposite from the first direction, the annular surface of the nut being larger than the annular surface of the bolt, a plurality of curved resilient tabs (54) on the annular surface on the nut whereby rotation between the nut and the bolt in a first direction will move together the annular surfaces on the nut and the bolt and whereby rotation between the nut and the bolt in a second direction will move apart the annular surfaces on the nut and the bolt with the moving apart retarded by frictional contact between the interior surface of the nut and the exterior surface of the bolt.

8. The system as set forth in claim 6 and further including a pressure assembly including a six sided annular surface (47) on the bolt, the annular surface on the bolt facing in a first direction, the pressure assembly also including a six sided annular surface (45) on the nut, the annular surface on the nut facing in a second direction opposite from the first direction, whereby rotation between the nut and the bolt in a first direction will move together the annular surfaces on the nut and the bolt and whereby rotation between the nut and the bolt in a second direction will move apart the annular surfaces on the nut and the bolt with the moving apart retarded by frictional contact between the interior surface of the nut and the exterior surface of the bolt.

9. The system as set forth in claim 6 and further including a pressure assembly including a six sided annular surface on the bolt, the annular surface on the bolt facing in a first direction, the pressure assembly also including a six sided annular surface on the nut, the annular surface on the nut facing in a second direction opposite from the first direction, the annular surface of the nut being larger than the annular surface of the bolt, a plurality of curved resilient tabs on the annular surface on the nut whereby rotation between the nut and the bolt in a first direction will move together the annular surfaces on the nut and the bolt and whereby rotation between the nut and the bolt in a second direction will move apart the annular surfaces on the nut and the bolt with the moving apart retarded by frictional contact between the interior surface of the nut and the exterior surface of the bolt.

10. The system as set forth in claim 6 and further including a pressure assembly including a six sided annular surface on the nut, the annular surface on the nut facing in a first direction, the pressure assembly also including a six sided annular surface on the bolt, the annular surface on the bolt facing in a second direction opposite from the first direction, a plurality of curved resilient tabs on the annular surface on the nut whereby rotation between the nut and the bolt in a first direction will move together the annular surfaces on the nut and the bolt and whereby rotation between the nut and the bolt in a second direction will move apart the annular surfaces on the nut and the bolt with the moving apart as caused by vibrations being retarded by frictional contact between the interior surface of the nut and the exterior surface of the bolt.

11. An anti-vibration nut/bolt system comprising:

a standard bolt having an axis and a bolt plane perpendicular to the axis, the bolt having male bolt threads, each male bolt thread having a bolt root and a bolt crest, each male bolt having a bolt root diameter consistent along the length of the bolt, each male bolt having a crest diameter consistent along the length of the bolt, each male bolt thread forming an axially interior male bolt surface (30) and an axially exterior male bolt surface (32), the axially interior male bolt surface extending radially exteriorly away from the axis and forming an angle of positive 30 degrees for a standard bolt with respect to the bolt plane, the axially exterior male bolt surface extending radially exteriorly from the axis and forming an angle of negative 30 degrees for a standard bolt with respect to the bolt plane;

the nut having an axis and a nut plane perpendicular to the axis, the nut having female nut threads, each female nut thread having a nut root and a nut crest, the nut root diameter consistent along the length of the nut, the nut crest diameter consistent along the length of the nut, each female nut thread forming an axially interior female nut surface (46) and an axially exterior female nut surface (48), the axially interior female nut surface extending radially interiorly toward the axis and forming an angle of positive 20 to 26 degrees with respect to the nut plane, the axially exterior female nut surface extending radially interiorly from the axis and foaming an angle of negative 20 to 26 degrees with respect to the nut plane, the nut threads formed as a triangle, the nut threads having a thread pitch, the thread pitch equal to the base of the triangle, the thread pitch of the nut thread forming a second base length, the distance between the nut root and the nut crest forming a second crest height, the second crest height relative to the angle of the axially exterior female nut surface;

the first base length being equal to the second base length, the second crest height being greater than the first crest height.

12. An anti-vibration nut/bolt system comprising:

A standard bolt having an axis and a bolt plane perpendicular to the axis, the bolt having male bolt threads, each male bolt thread having a bolt root and a bolt crest, each male bolt having a bolt root diameter consistent along the length of the bolt, each male bolt having a crest diameter consistent along the length of the bolt, each male bolt thread forming an axially interior male bolt surface (30) and an axially exterior male bolt surface (32), the axially interior male bolt surface extending radially exteriorly away from the axis and forming an angle of positive 27.5 degrees for a British standard bolt with respect to the bolt plane, the axially exterior male bolt surface extending radially exteriorly from the axis and forming an angle of negative 27.5 degrees for a British standard bolt and negative with respect to the bolt plane, the bolt threads formed as a triangle, the bolt threads having a thread pitch, the thread pitch equal to the base of the triangle, the thread pitch of the bolt forming a first base length, the bolt threads having a crest, the distance between the bolt root and the bolt crest forming a first crest height;

the nut having an axis and a nut plane perpendicular to the axis, the nut having female nut threads, each female nut thread having a nut root and a nut crest, the nut root diameter consistent along the length of the nut, the nut crest diameter consistent along the length of the nut, each female nut thread forming an axially interior female nut surface (46) and an axially exterior female nut surface (48), the axially interior female nut surface extending radially interiorly toward the axis and forming an angle of positive 20 to 26 degrees with respect to the nut plane, the axially exterior female nut surface extending radially interiorly from the axis and forming an angle of negative 20 to 26 degrees with respect to the nut plane, the nut threads formed as a triangle, the nut threads having a thread pitch, the thread pitch equal to the base of the triangle, the thread pitch of the nut thread forming a second base length, the distance between the nut root and the nut crest forming a second crest height, the second crest height relative to the angle of the axially exterior female nut surface;

the first base length being equal to the second base length, the second crest height being greater than the first crest height.

\* \* \* \* \*